July 25, 1944. F. L. SMITH 2,354,337
LOADING AND UNLOADING APPARATUS FOR SELF-PROPELLED VEHICLES
Filed Aug. 17, 1942 4 Sheets-Sheet 1

INVENTOR:
FRANK L. SMITH
BY W. G. Sullivan
ATTORNEY

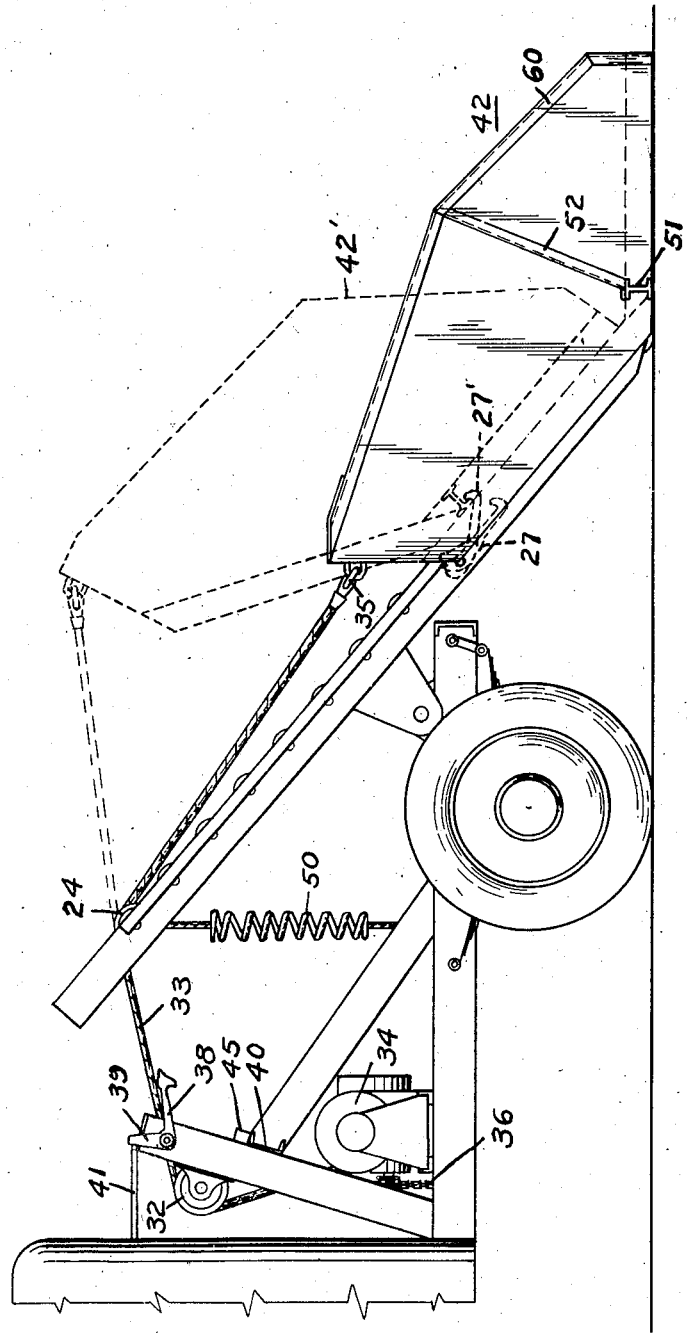

July 25, 1944. F. L. SMITH 2,354,337
LOADING AND UNLOADING APPARATUS FOR SELF-PROPELLED VEHICLES
Filed Aug. 17, 1942 4 Sheets-Sheet 3
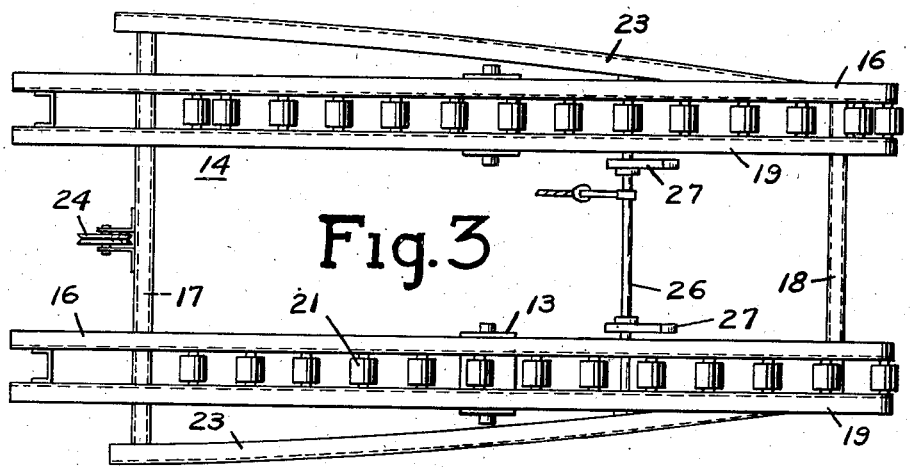
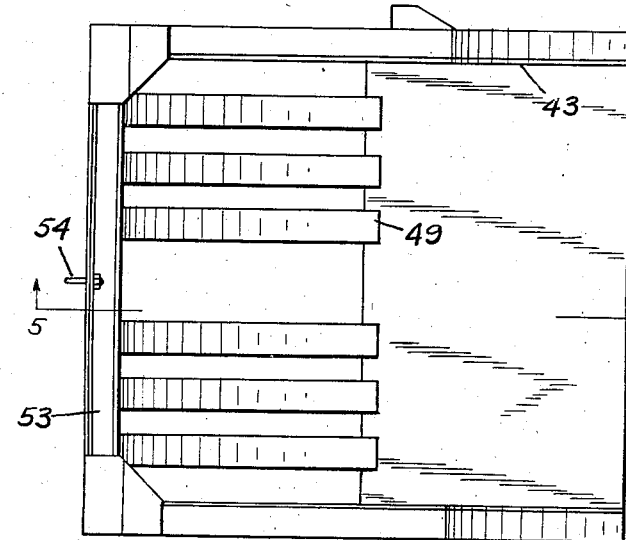
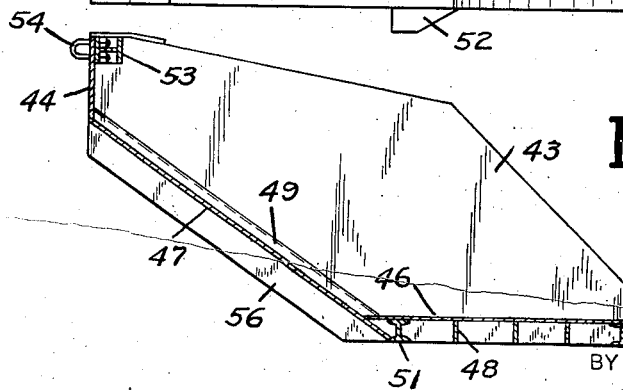
INVENTOR:
FRANK L. SMITH
BY
W. G. Sullivan
ATTORNEY July 25, 1944.   F. L. SMITH   2,354,337
LOADING AND UNLOADING APPARATUS FOR SELF-PROPELLED VEHICLES
Filed Aug. 17, 1942   4 Sheets-Sheet 4
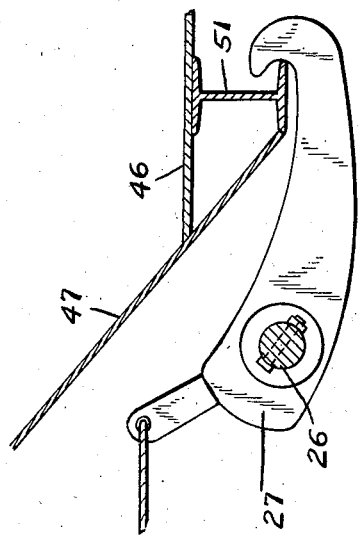
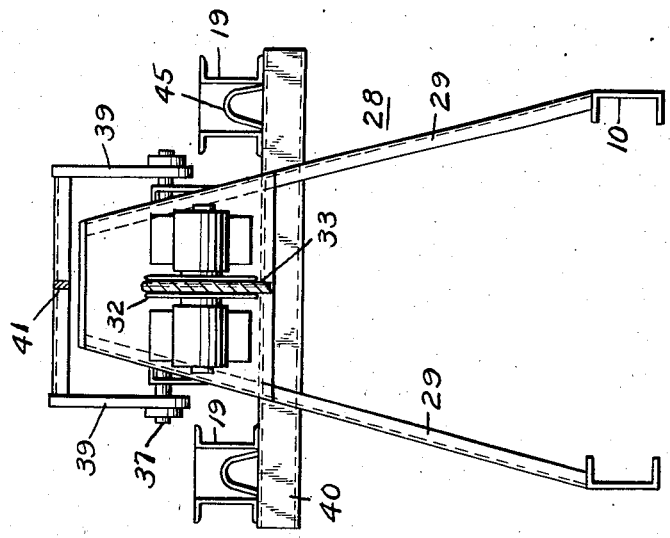
INVENTOR.
FRANK L. SMITH
BY
ATTORNEY.

Patented July 25, 1944

2,354,337

UNITED STATES PATENT OFFICE 2,354,337

LOADING AND UNLOADING APPARATUS FOR SELF-PROPELLED VEHICLES

Frank L. Smith, Mount Airy, N. C., assignor to The North Carolina Granite Corporation, Mount Airy, N. C., a corporation of Delaware Application August 17, 1942, Serial No. 455,146

3 Claims. (Cl. 214—84)

This invention relates to self-propelled load carrying vehicles such as trucks and more particularly to an improved apparatus employing a power source associated with the vehicle for moving relatively heavy loads onto the vehicle and unloading the same with a minimum of power, for maintaining the load securely on the vehicle during transit, and for eliminating undue strain on the vehicle parts and danger of over-turning the vehicle under heavy loading conditions.

It is a primary object of my invention to provide improved loading and unloading apparatus for self-propelled vehicles wherein a power source associated with the vehicle can be employed to load and unload relatively heavy loads with a minimum of power.

Another object of my invention is to provide improved loading and unloading apparatus for self-propelled vehicles wherein strain on the vehicle parts is minimized and danger of over-turning the vehicle under heavy load is eliminated.

Another object of my invention is to provide a self-propelled load-carrying vehicle having improved means for moving heavy loads onto the vehicle, transmitting said loads securely, and unloading the same in an improved manner.

According to the invention, a self-propelled truck is provided with a chassis having a table pivotally supported at the rear end of the chassis and normally maintained out of contact with the ground. The table preferably has anti-friction rollers for movably supporting a special box which is adapted to be actuated by a cable operatively connected to the vehicle power source. The box is designed to be supported by a flat base in a stable position when resting on the ground or a level surface whereby a bulk load of rock, dirt or the like may be disposed in the box. The front face of the box is inclined at an angle which will depress the table when the vehicle moves the table rearwardly into contact with the box and forces the table into contact with the ground or surface supporting the box.

The cable is then attached to the forward end of the box and upon retraction of the cable the box is drawn upwardly along the inclined table over the pivotal support of the table whereby the table is tilted out of ground contact and the box is locked in a position for transporting. After the truck reaches its destination the safety hooks for the box are released and the box is permitted to ride down the table under cable control and upon riding over the pivotal support the table is tilted to ground contact. The box prior to reaching the ground may be tilted to discharge its load or optionally may be deposited on the ground at the point of delivery in its original loaded position. Upon removal of the box from the table, the truck is free to transport another load. Also, a single heavy object may be loaded and transported in a similar manner rather than a bulk load and the special box may be eliminated in this instance.

The invention is more fully described and illustrated by the following description and drawings wherein:

Fig. 2 is a view similar to Fig. 1 showing the apparatus in different operative position.

Fig. 3 is a plan view of the table illustrated in Figs. 1 and 2.

Fig. 4 is a plan view of the box illustrated in Figs. 1 and 2.

Fig. 5 is a section taken along the line 5—5 of Fig. 4.

Fig. 6 is an enlarged fragmentary view looking from plane 6—6 of Fig. 1.

Fig. 7 is an enlarged sectional view showing the manner of engaging the dump hooks with the box.

Figure 1:
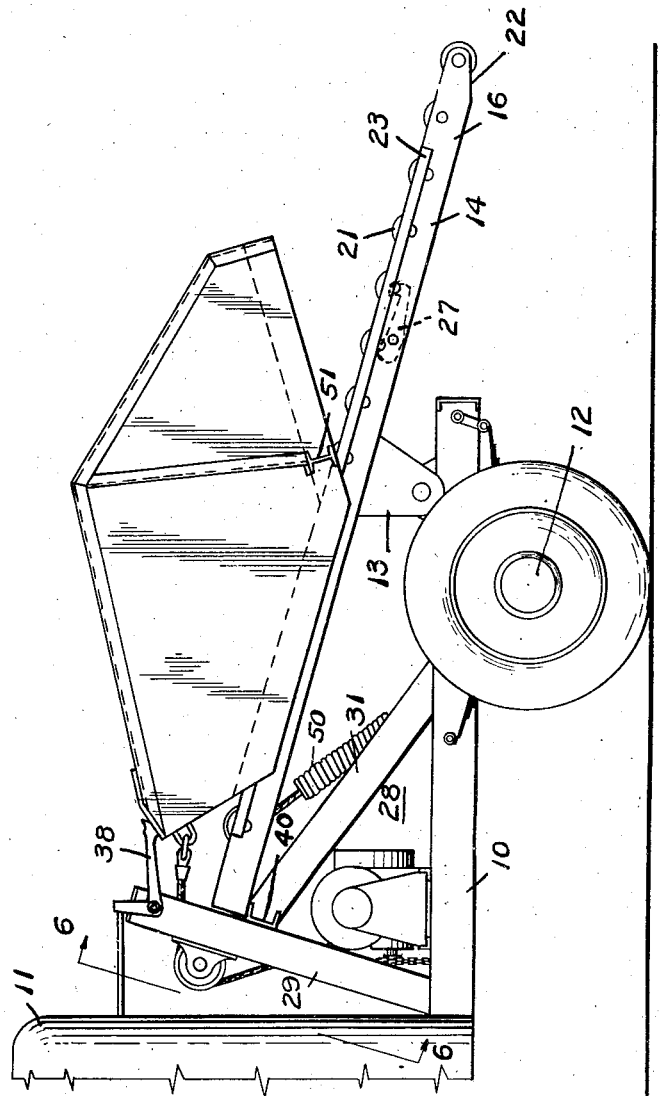
Fig. 1 is a side elevational view of the rear portion of a truck including my improved apparatus.

Referring now to the drawings, I have indicated generally at 10 the chassis of a conventional self-propelled truck having the usual operator's cab 11. The chassis is spring mounted on the rear axle 12 in the usual manner. A pair of laterally spaced trunnions 13 are secured to chassis 10 and pivotally support a table generally indicated at 14. The table 14 comprises longitudinally extending side members 16 and cross members 17 and 18. Each side member preferably is formed of a pair of channels 19 which support a plurality of longitudinally spaced rollers 21. The rollers extend slightly above the top surface of the channels 19 and the rear lower surface of each channel is inclined as indicated at 22 in Fig. 1 whereby the rear rollers will contact the ground when the table is inclined as illustrated in Fig. 2. Extending along each side of the table are guide elements 23 preferably of angle section for a purpose to be described. The forward cross member 17 of the table supports a sheave 24. A transverse shaft 26 is rotatably supported by the table side members 16 rearwardly of trunnions 13 and a pair of dump hooks 27 are fixed to the shaft.

A frame generally indicated at 28 comprises a pair of upwardly converging channels 29 secured at their lower ends to the truck chassis

10 and a pair of bracing members 31 also secured at their lower ends to the chassis 10 and preferably of channel section. Frame 28 supports a sheave 32. A cable 33 extending from a winch 34 is reeved through sheave 32 and also sheave 24 on table 14. Any suitable winch may be used but I preferably employ a worm-gear type driven from a forward and reverse power take-off from the truck motor. For example, the worm may be operatively connected with the truck drive shaft by a sprocket and chain as indicated at 36. Of course, the power take-off for operating the table will be controlled by the truck operator and any well known control mechanism accessible in the cab may be used.

Also supported by frame 28 is a rotatable shaft 37 to which are fixed a pair of safety hooks 38. Each of the hooks 38 have a bell-crank extension 39 connected to a rod 41 extending into the cab 11 whereby the hooks may be manipulated by the truck operator. A cross member 40, preferably of channel section, is secured to the frame and extends laterally outwardly of the table 14. A pair of centering elements 45 of inverted U form are secured to cross member 40 and are adapted to be disposed between the channels 19 forming the table side members.

The special box generally indicated at 42, and best illustrated in Figs. 4 and 5 will now be described. The box comprises a pair of side walls 43, a front wall 44, and a base having a horizontal portion 46 and an inclined portion 47 with the box in loading position or supported on the ground. The base portion 46 is preferably reinforced as indicated at 48 by plate cross members and the base portion 47 by longitudinally extending channel members as indicated at 49. A cross member 51, preferably of I section is extended beyond the side walls and is welded or otherwise secured to stiffening plates 52. A stiffening cross member 53, preferably of H section, is secured to the top portion of front wall 44 and forms a support for a U bolt 54 and also is adapted to engage safety hooks 38. It will be noted that the side walls 43 extend below base portion 47 as indicated at 56 to provide flanges which in co-operation with the guide elements 23 on the table 14 are adapted to center the box on the table.

The manner of operating the apparatus will now be described. The box will be supported as illustrated in Fig. 2 on the ground or other surface for loading. The load may be bulk such as dirt, rock, or the like or a granite block or blocks. The table 14 without load thereon is disposed to maintain the rear end of the table out of contact with the ground but in a position to strike the inclined portion 47 of the box. This may be effected by strong spring means 50 secured to the table and truck chassis whereby the table in unloaded condition will be maintained substantially in the position illustrated in Fig. 1. After the box is loaded the truck is backed towards the box whereby the rear rollers of the table strike the box base portion 47 and upon continued truck movement rearwardly the table is tilted downwardly to the position of Fig. 2 with the lowermost rollers 21 resting on the ground and other rollers engaging base portion 47. The table including the guide elements 23 will then be disposed between the side wall flanges 56. The cable hook 35 is then engaged with the bolt 54 of the box and the cable is retracted drawing the box upwardly along the table while supported by the rollers 21. Of course, the dump hooks 27 will be in the position illustrated in Fig. 1 so as not to interfere with upward box movement. When the load center passes over the pivot point of the trunnions 13 the table is rotated until the front end thereof rests on the cross member 40. The safety hooks 38 are designed so that they will automatically be lifted by contact with the front wall 44 of the box and ride over said wall to engage cross member 53.

It will be noted that when the box is in position for transporting, as shown in Fig. 1, that base position 46 of the box is upwardly inclined to retain the load within the box. Both the safety hooks 38 and the cable hook 35 secured to U bolt 54 insure that the box will be securely maintained on the truck during transit.

When it is desired to discharge the load the truck operator draws rod 41 forwardly to elevate the safety hooks 38 and the cable is unwound to permit the box 42 to move downwardly on table 14 by gravity. After the load center passes the pivotal axis of the trunnions 13 the table is tilted until the lowermost rollers 21 contact the ground and the box continues to move downwardly to the position of Fig. 2. Of course, several boxes may be used if desired and the truck can successively transport each box in the manner described.

If it is desired to dump the load before disposing the box on the ground the dump hooks 27 are elevated to the position 27' of Fig. 2 or the position of Fig. 7 to engage the cross member 51 and cause the box to be tilted to the dotted line position 42' whereby the box base portion 47 will be upstanding. The dump hooks 27 may be manipulated through rotation of shaft 26 and this may be effected by extending the shaft laterally of table 14 and providing a crank handle for an operator on the ground. The shaft may be rotated by the truck operator by providing a rock lever on the shaft operable by a cable extending to the cab.

Although the apparatus has been described as to bulk loads it is understood that the box 42 may be dispensed with if desired and a single heavy object loaded and transported by employing the cable to draw the object onto the table where it may be additionally secured by the safety hooks or otherwise.

It will now be understood that the table acts as an inclined plane during loading and unloading and that the power required for these operations is relatively small compared to a direct lift. Further, when the table is in contact with the ground it acts as an auxiliary support preventing any tendency of the truck to overturn and relieving the truck parts of undue strain.

While I have illustrated and described a preferred form of my invention I contemplate that numerous and extensive departures may be made therefrom without departing from the spirit of my invention and the scope of the appended claims.

What I claim is:

1. The combination with a self-propelled vehicle including a chassis, of a table pivotally supported adjacent the rear end of the chassis, means for normally maintaining the table in an inclined position out of contact with the ground, a box having a normally forwardly inclined base portion adapted to contact the rear portion of the table whereby the table will be tilted into ground contact and be disposed beneath said inclined base portion as the table is moved towards the box, means operable by the vehicle power source adapted to be secured to the box and move the same upwardly along the table and over the pivotal axis of the table whereby the table will be tilted out of ground contact, support means adapted to engage the forward end of the table, and co-operating guide means on the table and box for centering the box on the table.

2. The combination with a self-propelled vehicle including a chassis, of a table pivotally supported adjacent the rear end of the chassis, means for normally maintaining the table in an inclined position out of contact with the ground, a box having a normally forwardly inclined base portion adapted to contact the rear portion of the table whereby the table will be tilted into ground contact and be disposed beneath said inclined base portion as the table is moved towards the box, means operable by the vehicle power source adapted to be secured to the box and move the same upwardly along the table and over the pivotal axis of the table whereby the table will be tilted out of ground contact, support means adapted to engage the forward end of the table, and the table having a plurality of rollers therealong for supporting the box with the rearmost rollers being adapted to engage the ground when the table is tilted into ground contact.

3. The combination with a self-propelled vehicle, of a table pivotally supported adjacent the rear of the truck, a load box having a normally horizontally disposed base portion for supporting the box on the ground and an upwardly inclined base portion adapted to support the box on the table, means operable by the truck power source for drawing the box onto the table and over the pivotal axis of the table, and means engageable with the box base when the box is moved downwardly on the table for tilting the box into dumping position whereby the box is supported on the table by the normally horizontally disposed base portion.

FRANK L. SMITH.